May 6, 1941.  H. C. JOHNSON  2,240,785
ILLUMINATED MIRROR
Filed Feb. 4, 1938   2 Sheets-Sheet 1
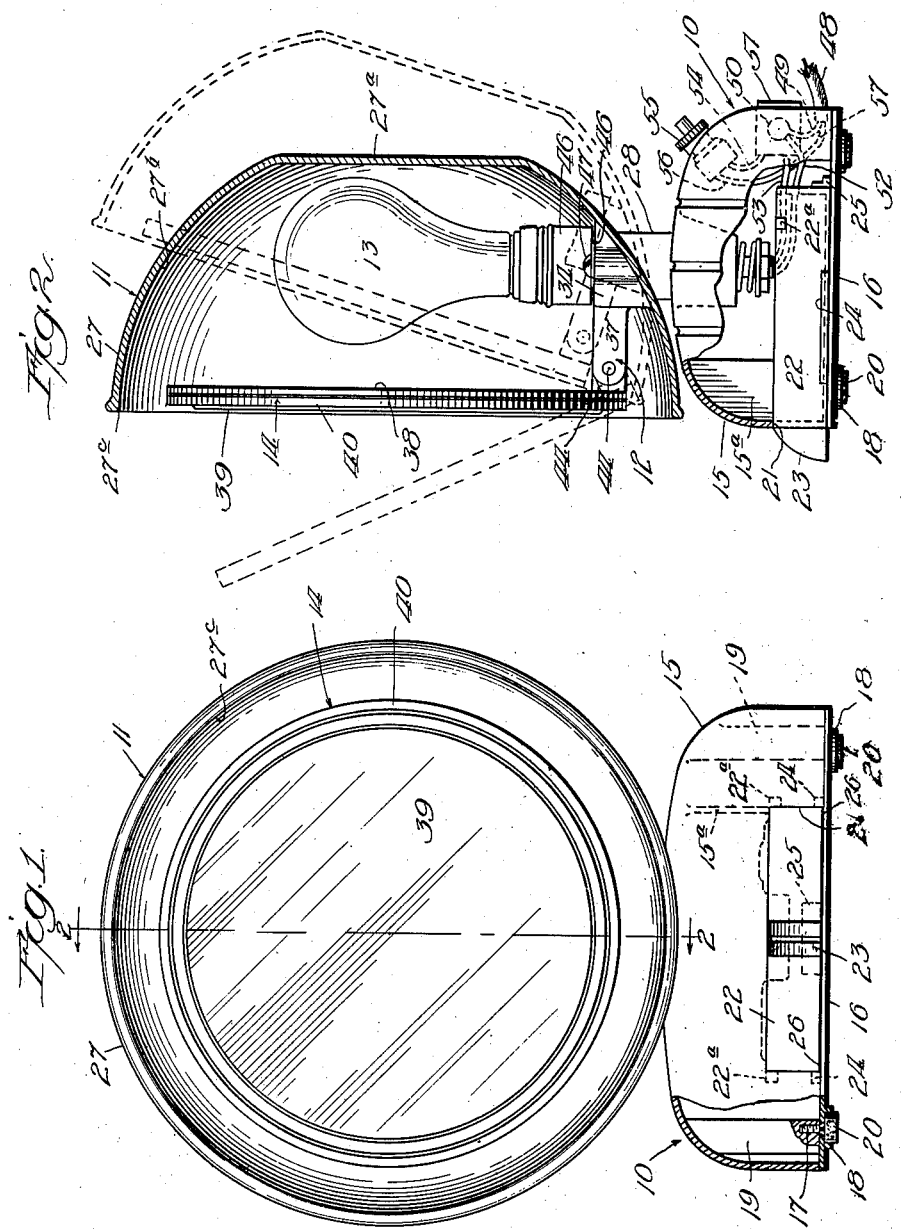
Inventor:
Herbert C. Johnson
by Davis, Lindsey, Smith & Shonts
Attys.

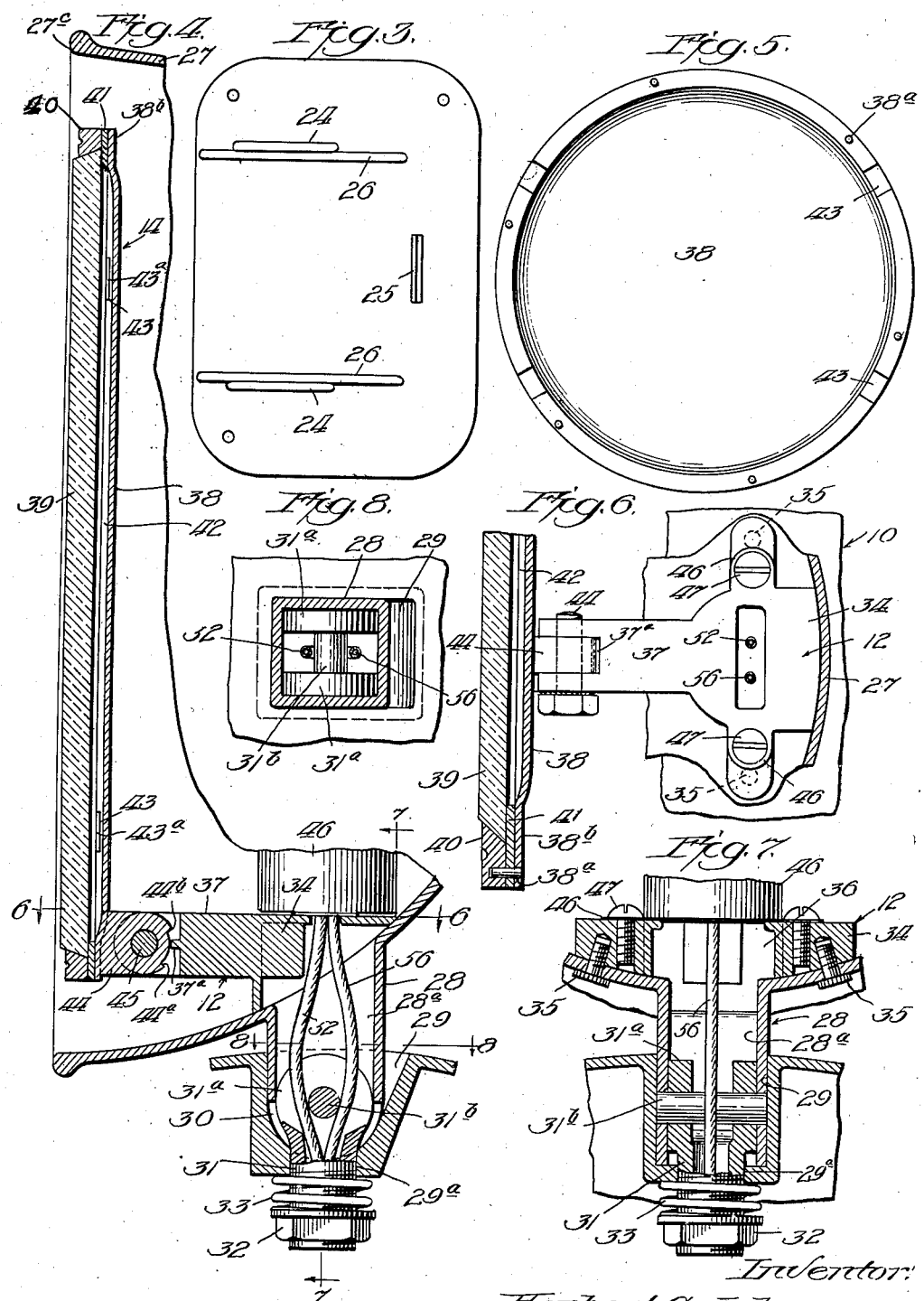

Patented May 6, 1941

2,240,785

UNITED STATES PATENT OFFICE 2,240,785

ILLUMINATED MIRROR

Herbert C. Johnson, Wilmette, Ill.

Application February 4, 1938, Serial No. 188,622

2 Claims. (Cl. 240—4.2)

My invention relates generally to illuminated mirrors, and it has to do particularly with mirrors of this character adapted for shaving, make-up, and other toilet purposes.

One of the objects of my invention is to provide an improved device of the foregoing character adapted for illuminating the mirror surface in such a way that the image of a face (including the sides thereof), or other object, is clearly reflected by the mirror in a shadowless manner without the light shining in the eyes of the user and without glare.

Another object is to provide an improved device of the class above mentioned which is simple in construction, is inexpensive to manufacture, may be easily and quickly assembled and disassembled, is compact and neat in appearance, and which is adapted to serve its intended purposes in a highly efficient manner.

A further object is to provide means for ventilating the mirror structure to avoid injury to the same by heat from the light source. Specifically, to this end, I employ a ventilated support for the mirror, the arrangement being such that induced air currents pass along the mirror backing (reflector surface) for cooling purposes.

Still another object is to provide a novel drawer arrangement for the storing of shaving and other toilet articles.

Additional objects are to provide an arrangement whereby maximum lighting efficiency is obtained from any given capacity lamp; to provide an improved arrangement of parts wherein connections are concealed, thereby aiding in compactness and neatness in appearance; and to provide an improved electrical lighting system for a device of the foregoing character whereby accessory toilet articles, such as electric razors, electric curling irons, etc., may be directly connected to the device thereby contributing to the convenience of the user.

Other objects and advantages will become apparent as this description progresses and by reference to the drawings wherein—

Figure 1 is a front elevational view of one form of device embodying my invention;

Fig. 2 is a vertical sectional view taken substantially on line 2—2 of Fig. 1, with the reflector unit and parts thereof shown in different positions of adjustment;

Fig. 3 is a fragmentary top plan view of the bottom plate of the base unit shown in Fig. 2;

Fig. 4 is an enlarged fragmentary central vertical sectional view of the reflector unit shown in Fig. 2;

Fig. 5 is a separated elevational view of the back portion of the mirror support shown in Fig. 4;

Fig. 6 is a fragmentary sectional view taken substantially on line 6—6 of Fig. 4;

Fig. 7 is a fragmentary sectional view taken substantially on line 7—7 of Fig. 4; and Fig. 8 is a fragmentary sectional view taken substantially on line 8—8 of Fig. 4.

The structure illustrated in the drawings includes a base unit 10 that adjustably supports a reflector unit 11 which, in turn, is provided with a carrier member 12 (Figs. 2, 4 and 7) that supports an electric lamp 13 and a mirror structure 14.

The base unit 10 (Figs. 1, 2 and 3) is comprised of a comparatively deep and hollow dome-like body 15, the open bottom portion of which is normally closed by a bottom plate 16 detachably secured in place by screws or other fastening devices 17 that pass through supporting legs 18 (one at each corner of the body 15) and engage suitably located threaded openings formed in bosses 19 formed on the body 15. The outer ends of the legs 18 are covered with felt or the like pads 20 to avoid marring of the surface on which the device is placed, as well as to conceal the fastening devices 17. The forward wall of the body 15 is provided with a rectangularly-shaped opening 21 through which moves a rectangularly-shaped drawer 22 having a centrally disposed handle part 23 on its outer side. The drawer 22 is guided and retained in alignment with the body opening 21 by a pair of elongated and laterally spaced upstanding ribs 24 and by a transverse rear stop rib 25 formed on the inner face of the bottom plate 16. The ribs 24 are spaced apart a distance substantially equal to the width of the drawer 22 and the rear stop 25 is located at such a point that when the rear wall of the drawer engages it, the front wall of the drawer will be properly aligned with the front wall of the body 15. To facilitate slide movement of the drawer and to minimize wear of parts, the inner face of the bottom plate 16 between the ribs 24 and immediately adjacent the ribs 24 is provided with very narrow and shallow ribs 26 upon which the side edges of the bottom of the drawer 22 seat for movement. In this way, the drawer slides back and forth upon these track-like ribs, being confined thereon by the lugs 24. Once the device has been completely assembled, the drawer 22 cannot be entirely removed and, to this end, the side walls of the drawer 22, near the upper rear edges thereof, are provided with laterally extending stop lugs 22ª which will engage the inner surface of the front wall of the body 15 when the drawer 22 is pulled out to its intended extent. In this way, the drawer 22 cannot be displaced, accidentally or otherwise, and the electrical connections shown in Fig. 2, and hereinafter referred to more particularly, are rendered inaccessible without disassembly of the base unit.

Also, tipping of the drawer 22 is prevented by a body rib 15ª (Figs. 1 and 2). The lower edge of such rib is aligned with one of the sides of the drawer so that the drawer will engage it if an attempt is made to tip the latter. In this way, the drawer cannot be moved to engage the other base-contained parts.

The so-called reflector unit 11 includes a bowl-shaped reflector casing 27 (Fig. 2) disposed normally in edgewise relation with respect to the base unit 10. The reflector casing 27 is provided with an annular flat bottom reflecting surface 27ᵃ and an outwardly-flaring and curved side reflecting surface 27ᵇ. The reflector casing 27 is mounted upon the base unit 10 for backward and forward movements; and, to this end, the lower side wall portion of the reflector is provided with an exterior, tubular, dependent and rectangular-shaped part 28 (Figs. 4, 7 and 8) which is received within a pocket 29 integrally formed in the top wall of the base body 15. The forward wall of the pocket 29 (Fig. 4) is substantially vertical, while its rear wall is inclined rearwardly so as to permit the reflector to move from the substantially vertical position to a tilted position as shown in full and dotted lines in Fig. 2.

The lower end of the reflector part 28 (Figs. 4 and 7) is bifurcated and rounded as at 30 and it hingedly supports (by a pin 31ᵇ) the rounded head 31ᵃ of a tubular bolt member 31, the tubular shank of which extends downwardly through an opening 29ᵃ in the bottom wall of the pocket 29. The inner surface of the bottom wall of the pocket 29 is rounded complementally to the lower end of the connecting part 28 so that such surfaces rock upon each other when the reflector 27 is moved as hereinabove stated. The reflector is retained yieldably in connected relation to the base body 15 by a nut 32 on the lower threaded end of the bolt 31, and by a spring 33 disposed between such nut and the adjacent surface of the bottom wall of the pocket 29. In this way, the spring 33 yieldably presses the bolt 31 downwardly to seat the rounded end of the part 28 upon the rounded bottom surface of the pocket 29, thereby holding the reflector unit 11 under tension in any position to which it may be adjusted.

The carrier members 12 (Figs. 2, 4, 6 and 7) is provided with a body part 34 detachably secured to the reflector casing 27 by screws 35. This carrier 12 is so located that a central opening 36 therein is aligned with the opening 28ᵃ (Figs. 4, 7 and 8) in the reflector connecting part 28. The carrier 12 is further provided with a forwardly extending arm 37 which is disposed in spaced relation to the side wall of the reflector. The outer end of the carrier arm 37 is bifurcated for adjustably supporting the mirror structure 14.

The mirror structure 14 (Figs. 4, 5 and 6) includes a cylindrical back plate 38 formed, preferably, of metal. Specifically, to this end, the peripheral edge of the mirror 39 tapers downwardly and outwardly from its back edge, and this peripheral edge is engaged and retained by a ring 40, the inner edge of which is tapered complementally to the peripheral edge of the mirror. The ring 40 is secured to the peripheral edge portion of the back plate 38 by any suitable fastening means, such as screws, rivets, or the like, passing through the back plate openings 38ᵃ into aligned openings in the ring 40. By so securing the ring 40, the mirror is retained in place.

The mirror 39 is of ordinary form having the usual reflecting back surface which should be protected against excessive heat in order to avoid injury to the same, which would impair its reflecting ability. It will be noted that the electric lamp 13 is located behind the mirror structure 14 and, normally, in fairly close relation to such unit; and, to avoid injurious heating of the mirror, I provide a space 42 between the mirror 39 and the back plate 38 and ventilate the same in such a way as to induce an air circulation therethrough. Specifically, a narrow ring-type gasket 41 (Figs. 4 and 6) is disposed between the ring 40 and the peripheral edge portion of the back plate 38. The peripheral edge portion 38ᵇ of the back plate 38 is flat so as to seat flatwise against the gasket 41; and the gasket is of such width as to extend throughout the width of the seat 38ᵇ, but not beyond it. The gasket 41 is of slightly greater width than the ring 40 so that it seats, in part, against the peripheral edge portion of the back of the mirror 39 so that, when the ring 40 is finally secured to the back plate 38, the mirror is firmly retained in place without any metal of the back plate contacting the same. Also, in this way, the space 42 is provided between the back of the mirror and the front face of the back plate 38, which space is increased in depth somewhat by bulging that portion of the plate 38 bounded by the peripheral edge seat 38ᵇ.

The space 42 is ventilated in such a way that currents of air induced by the heated condition of the parts are caused to flow into and out of such space with resultant heat-dissipation action. Specifically, the peripheral seat portion 38ᵇ of the back plate 38 is provided with an annular series of spaced recesses 43 which, upon assembly of the mirror 39, ring 40 and gasket 41, provide around the periphery of the mirror structure 14 a plurality of slots 43ᵃ connecting the space 42 to atmosphere and through which air may circulate in a manner that will be well understood.

The mirror structure 14 (Figs. 1, 2 and 4) is of a diameter somewhat less than the diameter of the rim portion 27ᶜ of the reflector 27. The space between the mirror edge and the reflector is of such width that light from the lamp 13 may readily pass (by reflection and otherwise) therethrough for accomplishing the illumination of the image (face or other object) to be reflected in the mirror 39. Various lighting conditions may be accomplished by movement of the mirror structure 14 toward and from the lamp 13. To permit of this, the lower edge of the mirror structure 14 is adjustably supported by the arm 37. Specifically, the lower edge of the back plate 38 is provided with a rearwardly-extending lug 44 which is hingedly secured between the bifurcations at the outer end of the arm 37 by a suitable pivot screw 45. The screw 45 passes freely through the lug 44 and one of the bifurcated parts of the arm 37 and it screw-threadedly engages the other bifurcated part so that by adjusting it properly the mirror structure may be moved to and retained in various positions.

It is desirable that the adjustment movements of the mirror structure 14 (Fig. 4) be limited to extents wherein it may be moved outwardly only to an extent sufficient to readily permit removal and insertion of the lamp 13, and moved inwardly to an extent somewhat less than that necessary to contact the back plate 38 with the lamp 13. To this end, the inward end of the back plate lug 44 is rounded and formed with a slot providing shoulders 44ᵃ and 44ᵇ adapted to cooperate with a stop element 37ª located at the inner end of the bifurcated portion of the arm 37. The stop element 37ª is adapted to engage the stop shoulders 44ª and 44ᵇ as the mirror structure 14 is rocked backwardly and forwardly. It will be noted that, when the mirror structure 14 is in its normal vertical position, the stop shoulder 44ᵇ is closer to the stop element 37ª than is the stop shoulder 44ª, for the purpose of differentially limiting the movements of the mirror structure as above stated.

The electric lamp 13 is detachably carried in an electrical socket 46 (Figs. 2, 6 and 7) having laterally extending bottom ears 46ª detachably secured to the top of the carrier 12 by screws or other fastening devices 47. The socket 46 is axially aligned with the opening 36 of the carrier 12 so that electric wiring therefor may readily extend downwardly through the carrier 12, the reflector connecting part 28 and the bolt 31 for connection with the suitable electric outlet and switch means which will now be described.

The electric connections may include the usual outlet cord 48 (Fig. 2) having one wire 49 thereof connected to the terminal 50 of a suitable outlet plug 51. The outlet plug 51 may be employed for electrically attaching an electric razor, electric curling iron, or the like. The terminal 50 is also connected to a wire 52 (Figs. 2 and 4) leading through the reflector connections to the lamp socket 46, as above stated. It will be noted that the reflector connections are so constructed and arranged that wires may pass therethrough in a concealed manner without interfering with the hinging action of the reflector unit. The other lamp wire 53 is connected to the other terminal (not shown) of the outlet plug 51 which is, in turn, connected by a wire 54 to one of the terminals of a switch 55 which may take any suitable form. The other terminal of the switch 55 is connected by a wire 56 to the other main line wire 57. In this way, the switch 55 controls both the lamp and outlet plug circuits, the outlet plug 51 being connected in series with the lamp 13, so that electric current for the outlet accessory (to be attached to the plug 51) will not be supplied except when the lamp 13 is lighted. However, if desired, the plug and lamp may be connected in parallel so that current will be supplied to the electric accessory at any time, whether the lamp 13 is lighted or not.

It is desirable that the image lighting effect above referred to be accomplished without glare, while attaining substantially full benefit of the light from the lamp 13. To this end, in addition to the particular mounting of the mirror relative to the lamp and reflecting surface, I preferably treat the back plate 38 and the inner surface of the reflector 27 in the manner disclosed in Patent No. 1,495,625, granted to Julius Wolf on May 27, 1924. That is to say, the interior surface of the reflector bowl, and particularly the flaring portion thereof, is preferably coated with a material that will furnish a flat, white finish. This is also true of the exposed surface of the back plate 38 which faces the lamp 13.

I believe that the operation and use of my invention will be readily understood from the foregoing description. In use, with the lamp 13 lighted, the light is directed, without glare, through the space around the edge of the mirror structure 14, and this lights up the image to be reflected. If the image be the user's face, the light is so directed as to give clear vision of the entire face, including the sides thereof, without shadow effect. The desired illuminating effect may be attained regardless of the extraneous lighting conditions—whether the device be used in darkness, in daylight or in a lighted space. The device may be used as desired without overheating of the mirror, due to the ventilating arrangement already mentioned. Devices of this character are used under conditions where neatness in appearance is an important consideration; and my invention takes care of this condition by concealing the parts in such a way that movable connections and electric connections, except the main outlet, are concealed. The arrangement of parts shown and described facilitates the use of a drawer in the base for the convenience of the user, which drawer is movable inward and outward without engaging the other base contained parts. The device is quite simple in construction, the parts being so put together that they may be readily and quickly assembled and disassembled. The parts are so constructed and arranged that the entire structure may be manufactured and sold at a relatively low cost.

While I have shown and described only one form of device embodying my invention, it is to be understood that changes in details and arrangement of parts may be resorted to without departing from the spirit and scope of my invention as defined by the claims that follow.

I claim:

1. An illuminated mirror device comprising a base, a reflector unit carried by said base including a reflector, a lamp in front of the reflecting surface of said reflector and a mirror in front of said lamp and having its back portion facing said lamp, a support unit detachably secured to said reflector unit and supporting both said mirror and lamp relative to said reflector, and means for adjustably mounting said reflector unit upon said base for movement thereof backwardly and forwardly including a non-circular member integral with and depending from said reflector, means forming a complementally shaped socket in said base, a hinge member detachably secured in said socket, and a hinge connection between said reflector-carried member and said hinge member disposed wholly within said base and concealed thereby.

2. An illuminated mirror device comprising a base, a reflector unit including a reflector member, a carrier member detachably fixed to said reflector member, a lamp detachably supported by said carrier member in front of the reflecting surface of said reflecting member, a mirror support on said carrier member, a mirror carried by said support and having its back portion disposed toward said lamp, means for adjustably connecting said support to said carrier for movement of the mirror toward and from said lamp including an arm extending from said support and an arm extending from said carrier and hingedly connected to said support arm, said means and lamp being normally concealed by said mirror and its said support, and means for adjustably mounting said reflector unit upon said base for movement of the former back and forth including a member projecting from said reflector member, and a hinge connection between said projecting member and said base and within the latter where it is concealed.

HERBERT C. JOHNSON.